United States Patent [19]
Kosugi

[11] Patent Number: 6,075,897
[45] Date of Patent: *Jun. 13, 2000

[54] IMAGE COMPRESSION APPARATUS

[75] Inventor: Masato Kosugi, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,001

[22] Filed: Dec. 26, 1995

[30] Foreign Application Priority Data

Dec. 28, 1994 [JP] Japan .................................. 6-328491

[51] Int. Cl.$^7$ ...................................................... G06K 9/36
[52] U.S. Cl. .......................... 382/232; 382/250; 382/251; 348/405
[58] Field of Search ..................................... 382/232, 236, 382/238, 244, 245, 246, 248, 250, 251; 348/400, 405, 699, 401, 407, 398, 438, 404, 422; 375/240

[56] References Cited

U.S. PATENT DOCUMENTS

| 5,245,427 | 9/1993 | Kunihiro | 348/400 |
| 5,357,584 | 10/1994 | Yamoska | 382/232 |
| 5,398,078 | 3/1995 | Masuda et al. | 348/699 |
| 5,479,527 | 12/1995 | Chen | 382/232 |
| 5,543,845 | 8/1996 | Asamura et al. | 348/407 |
| 5,570,203 | 10/1996 | Suzuki et al. | 382/250 |
| 5,621,466 | 4/1997 | Miyane et al. | 348/405 |

*Primary Examiner*—Jose L. Couso
*Assistant Examiner*—Anh Hong Do
*Attorney, Agent, or Firm*—Fitzpatrick Cella Harper & Scinto

[57] ABSTRACT

An image compression apparatus includes an orthogonal transformation circuit for orthogonally transforming image data to obtain a transformation coefficient, a quantization unit for quantizing the transformation coefficient by using a quantization table to obtain quantized data, a first storage unit for storing the quantized data, a compression-coding unit for compression-coding the quantized data read out from the first storage unit to obtain coded data, and a second storage unit for storing the coded data.

3 Claims, 5 Drawing Sheets

$$\begin{pmatrix} 15 & 11 & 10 & 16 & 24 & 40 & 51 & 61 \\ 12 & 13 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 58 & 109 & 113 & 92 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{pmatrix}$$

FIG. 3

$$\begin{pmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{pmatrix}$$

FIG. 4

$$\begin{pmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & 6 & -1 & 0 & -4 & -1 & 0 & -1 \\ -3 & 2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{pmatrix}$$

IMAGE COMPRESSION APPARATUS

BACKGROUND OF THE INVENTION

1. Field of the Invention

The present invention relates to an image compressing apparatus for compression-coding image data.

2. Related Background Art

JPEG (Joint Photographic Expert Group) algorithms are standardized as an international standard coding system for color still images.

The JPEG algorithms are roughly classified into DCT (Discrete Cosine Transform) as an irreversible coding system and DPCM (Differential Pulse Code Modulation) which is a reversible coding system capable of loss-less compression. Of these systems, one category of the DCT system, called a base-line process, has found widespread use as a de-facto-standard in both hardware (digital cameras) and software (e.g., viewers).

In performing conventional compression coding, some users need loss-less (reversible coding) compression. In the loss-less coding, data does not deteriorate however many times compression and expansion are repeated. However, if the DPCM system is used as the loss-less compression, an image compression and expansion apparatus must support both the DCT system and the DPCM system. This increases the hardware scale. Also, the data cannot be reproduced on personal computers because the loss-less compression is not supported by viewers.

If a quantization or subsampling step is omitted from the DCT system, it is possible to obtain compressed data close to loss-less compressed data, which cannot be distinguished from original images with the naked eye. The amount of this compressed data is larger than when quantization or subsampling is performed, and so a pipeline stall readily takes place in a compression apparatus. This extremely lowers the processing speed.

SUMMARY OF THE INVENTION

The present invention has been made to solve the above problems and has as its object to provide an image compression apparatus capable of performing pseudo loss-less compression and making a pipeline stall rarely occur.

One embodiment of the present invention comprises orthogonal transforming means for orthogonally transforming image data to obtain a transformation coefficient, quantizing means for quantizing the transformation coefficient by using a quantization table to obtain quantized data, first storage means for storing the quantized data, compression-coding means for compression-coding the quantized data read out from the first storage means to obtain coded data, and second storage means for storing the coded data.

Another embodiment of the present invention comprises orthogonal transforming means for orthogonally transforming image data to obtain a transformation coefficient, quantizing means for quantizing the transformation coefficient by using data of quantization table whose all elements are "1" (refer to this table as "all-"1" quantization table" hereinafter) to obtain the quantized data, and compression-coding means for compression-coding the quantized data to obtain coded data.

Still another embodiment of the present invention comprises orthogonal transforming means for orthogonally transforming image data to obtain a transformation coefficient, and compression-coding means for compression-coding the transformation coefficient to obtain coded data.

Still another embodiment of the present invention comprises orthogonal transforming means for orthogonally transforming image data to obtain a transformation coefficient, quantizing means for quantizing the transformation coefficient by using all-"1" quantization table data to obtain quantized data, first storage means for storing the quantized data, compression-coding means for compression-coding the quantized data read out from the first storage means to obtain coded data, and second storage means for storing the coded data.

Still another embodiment of the present invention comprises orthogonal transforming means for orthogonally transforming image data to obtain a transformation coefficient, first storage means for storing the transformation coefficient, compression-coding means for compression-coding the transformation coefficient read out from the first storage means to obtain coded data, and second storage means for storing the coded data.

Still another embodiment of the present invention comprises orthogonal transforming means for orthogonally transforming image data to obtain a transformation coefficient, quantizing means for quantizing the transformation coefficient by using a quantization table to obtain quantized data, selecting means for selecting the transformation coefficient or the quantized data, first storage means for storing the selected transformation coefficient or quantized data, compression-coding means for compression-coding the transformation coefficient or quantized data read out from the first storage means to obtain coded data, and second storage means for storing the coded data.

In one embodiment of the present invention, the first storage means is provided to store quantized data and apply the data to the compression-coding means. This prevents the second storage means for storing compression-coded data from becoming full and thereby avoids a pipeline stall.

In another embodiment of the present invention, the all-"1" quantization table data is used in quantization. Consequently, pseudo loss-less compression coding can be realized without increasing the circuit scale.

In still another embodiment of the present invention, a transformation coefficient is directly compression-coded without performing any quantization. Accordingly, pseudo loss-less compression coding can be realized without increasing the circuit scale.

In still another embodiment of the present invention, quantization is done by using all-"1" quantization table data, and the first storage means is provided to store the quantized data and apply the data to the compression-coding means. Therefore, pseudo loss-less compression can be performed without increasing the circuit scale. Additionally, it is possible to prevent the second storage means from becoming full and thereby eliminate a pipeline stall.

In still another embodiment of the present invention, a transformation coefficient is compression-coded without performing quantization, and the first storage means is provided to store the transformation coefficient and apply the coefficient to the compression-coding means. Consequently, pseudo loss-less compression can be realized without increasing the circuit scale. It is also possible to prevent the second storage means from becoming full and thereby eliminate a pipeline stall.

In still another embodiment of the present invention, one of a transformation coefficient and quantized data is selected, and the first storage means is provided to store the selected transformation coefficient or quantized data and apply the coefficient or data to the compression-coding means. This allows a single circuit to perform regular compression coding if the quantized data is selected and pseudo loss-less compression coding if the transformation coefficient is selected. It is also possible to prevent the second storage means for storing the compression-coded data from becoming full and thereby eliminate a pipeline stall.

Other objects and advantages of the invention become apparent from the following detailed description taken in conjunction with the accompanying drawings.

BRIEF DESCRIPTION OF THE DRAWINGS

FIG. 2 is a view showing an example of a quantization table;

FIG. 3 is a view showing an example of an 8×8 pixel data block;

FIG. 4 is a view showing examples of DCT coefficients;

DETAILED DESCRIPTION OF THE PREFERRED EMBODIMENTS

Figure 1:
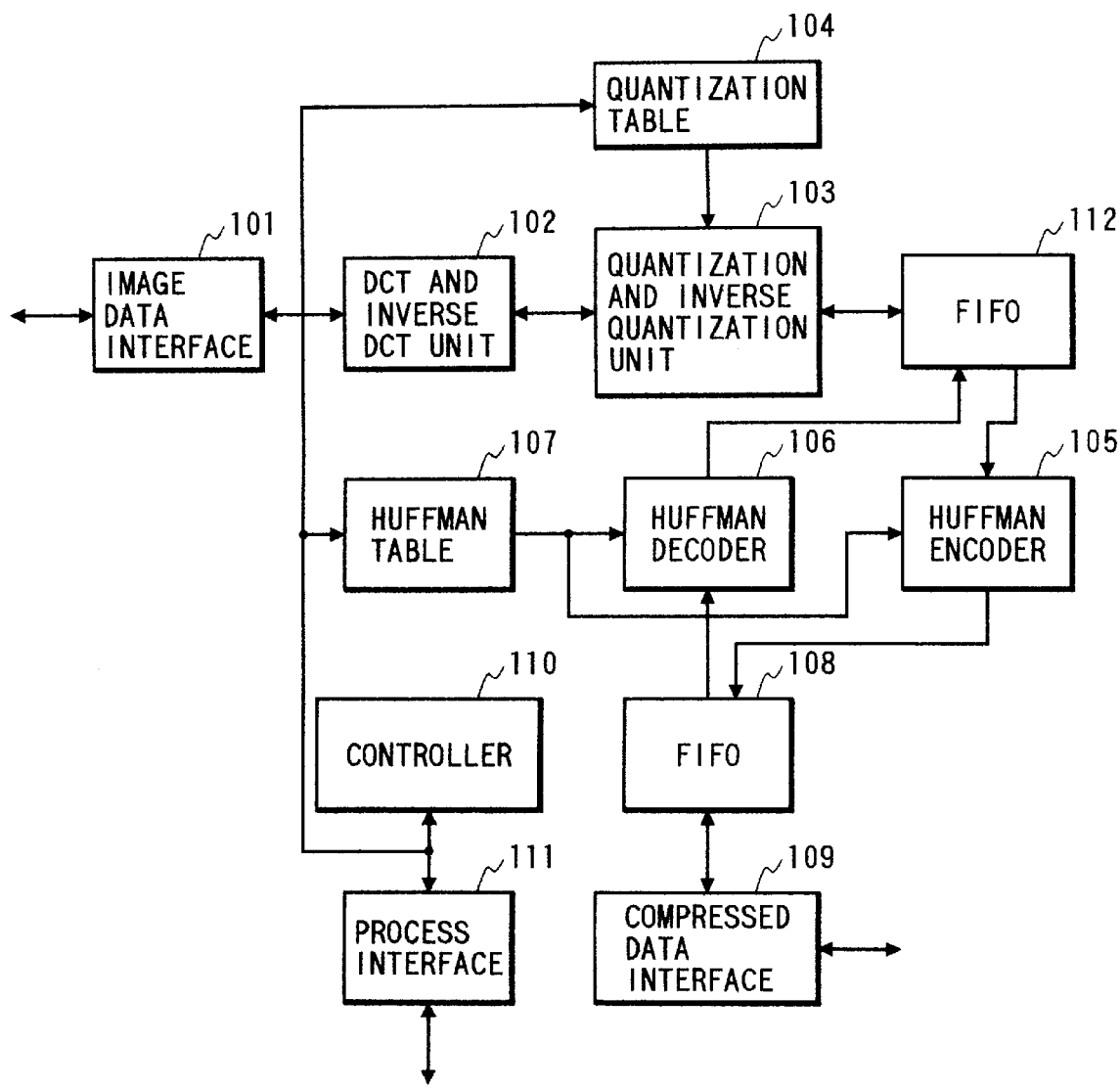
FIG. 1 is a block diagram showing the first embodiment of the present invention.

FIG. 1 is a block diagram showing a DCT compression and expansion apparatus according to the first embodiment of the present invention. Referring to FIG. 1, this apparatus includes a double-buffer interface 101 for image data before compression and expanded image data; a DCT and inverse DCT unit 102 for calculating discrete cosine transforms and inverse discrete cosine transforms; a quantization and inverse quantization unit 103; a quantization table 104 for the quantization and inverse quantization unit 103; a Huffman encoder 105; a Huffman decoder 106; a Huffman table 107 for the Huffman encoder 105 and the Huffman decoder 106; a FIFO memory 108; an interface 109 for compressed data and data before expansion; a controller 110 for controlling the operations of these modules; and an interface 111 for a processor which reads and writes data to be given to the controller 110.

This embodiment also includes a FIFO memory 112 between the quantization and inverse quantization unit 103 and the Huffman encoder 105 and the Huffman decoder 106.

An operation of performing normal DCT compression in the above configuration will be described below. First, an external processor writes quantization table data and Huffman coding table data in the quantization table 104 and the Huffman table 107, respectively, via the process interface 111.

FIG. 2 shows an example of the quantization table 104. The characteristic feature of the quantization table 104 is that values increase as the coordinate axes increase.

Subsequently, the external processors sets a compression mode flag in the controller 110 via the process interface 111. When the compression mode flag is set, the controller 110 initializes each module in a compression mode and enables the direction of each data bus in the direction of the compression mode. Each initialized module is thus set in a compression standby state. After verifying that each module is set in the compression standby state, the controller 110 sets a Ready flag which is polled by the external processor. The external processor verifies that the Ready flag is set and starts compression.

The external processor sets a frame flag and a block flag in the controller 110. The external processor then transfers image data corresponding to an 8×8 pixel block to the image data interface 101 and resets the block flag (this operation will be referred to as block transfer hereinafter). FIG. 3 illustrates an example of the 8×8 pixel block.

When the first block transfer is completed as above, the external processor reads the Ready flag to check whether the apparatus can receive data. If the Read flag is set and the apparatus is capable of receiving data, the external processor starts the second block transfer in the same manner as for the first block transfer. Also, when the first block transfer is completed, the image data interface 101 verifies that a DCTBusy flag of the DCT and inverse DCT unit 102 is reset and transfers the first block data.

When verifying that 64-word data is transferred, the image data interface 101 and the DCT and inverse DCT unit 102 determine that the transfer is completed. The DCT and inverse DCT unit 102 sets the DCTBusy flag to start DCT computation. FIG. 4 illustrates examples of coefficients when this DCT computation is completed.

When the DCT computation is completed, the DCT and inverse DCT 102 verifies that a QBusy flag of the quantization and inverse quantization unit 103 is reset, and transfers the first block data to the quantization and inverse quantization unit 103. This transfer can be done either in units of blocks or in units of words. When the transfer is completed, the quantization and inverse quantization unit 103 sets the QBusy flag and performs quantization on the basis of the data in the quantization table 104. When completing data transfer of one block, the DCT and inverse DCT unit 102 resets the DCTBusy flag and receives the second block data, and the external processor applies the third block data to the image data interface 101. After it is verified that a Full flag is reset, the first block data quantized by the quantization and inverse quantization unit 103 is transferred in units of words or blocks to the FIFO memory 112. When the transfer is completed, the QBusy flag is reset.

Figure 5:
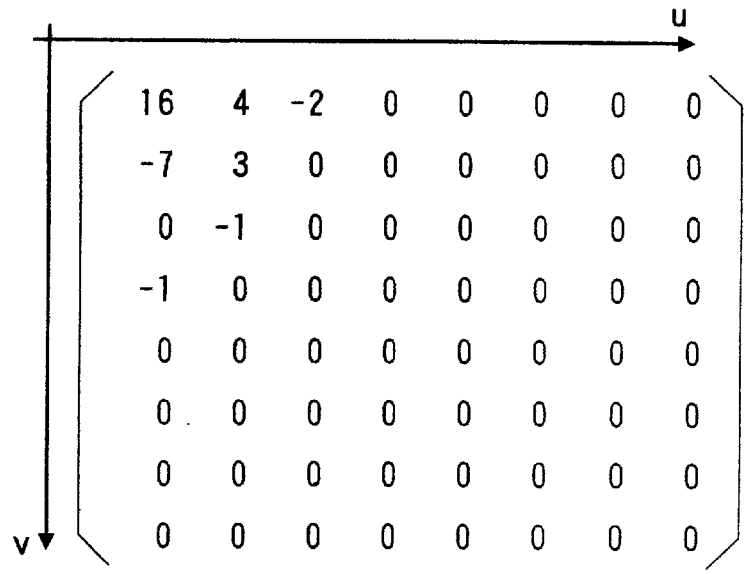
FIG. 5 is a view showing examples of quantized DCT coefficients.

FIG. 5 shows the quantized data. Note the coefficients are input to the FIFO memory 112 such that a DC coefficient of u=v=0 is input first and then AC coefficients are input as they are scanned in a zigzag manner.

After verifying that the QBusy flag is reset, the DCT and inverse DCT unit 102 transfers the second block data to the quantization and inverse quantization unit 103 and resets the DCTBusy flag. Also, the image data interface 101 verifies that the DCTBusy flag is reset and transfers the third block data to the DCT and inverse DCT unit 102. Furthermore, the external processor verifies that the Ready flag of the controller 110 is set and transfers the fourth block data to the image data interface 101.

The FIFO memory 112 verifies that a Full2 flag of the FIFO memory 108 is reset and sequentially outputs the first block data to the Huffman encoder 105. On the basis of the Huffman table 107, the Huffman encoder 105 performs Huffman coding for the difference of the DC coefficient from that of the previous block and performs two-dimensional Huffman coding for the AC coefficients by run-length count and grouping. The Huffman-coded data is input in units of words to the FIFO memory 108.

When the data is input, the FIFO memory 108 sets C data Ready flag and a frame out flag of the controller 110 and instructs the external processor to read the data via the compressed data interface 109. The external processor polls the C data Ready flag and the frame out flag. If the frame out flag is set, the external processor determines that the start position of the compressed data is detected. If the C data Ready flag is set, the external processor reads the compressed data via the compressed data interface 109. Note that the C data Ready flag is reset when the FIFO memory 108 is empty.

The sequence is proceeded in the same fashion as above for the fifth and subsequent block data, and the frame flag is reset when the final block is input. The controller 110 verifies in accordance with resetting of the frame flag that the data is the final data block. Accordingly, the controller 110 resets the frame out flag at the same time the final output of the final block data is read via the compressed data interface 109, informing the external processor that the data is the final data.

The compression sequence is completed when the final data is read as described above. Note that the controller 110 monitors, e.g., the Busy flag and the Full flag of the individual modules and reflects the monitoring results on the Ready flag and the like flags, and also performs error management.

An operation of performing pseudo loss-less compression will be described below.

Figure 6:
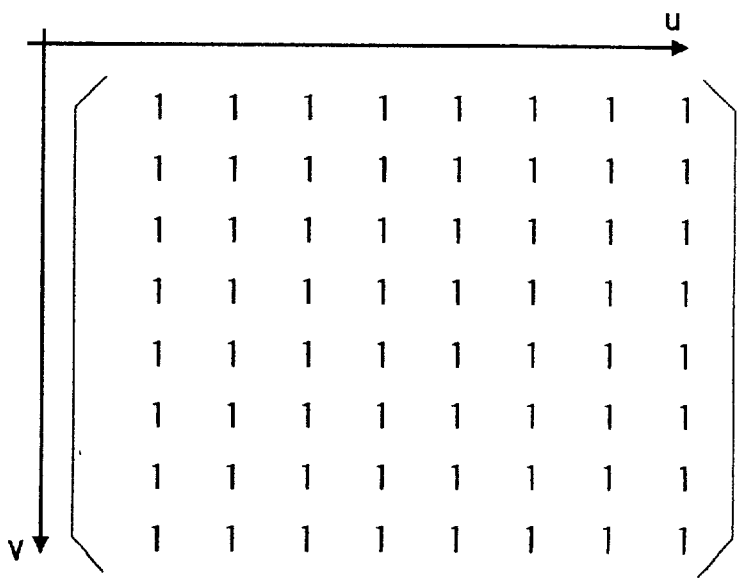
FIG. 6 is a view showing a quantization data table used in pseudo loss-less compression.

FIG. 6 shows quantization table data used when pseudo loss-less compression is performed. As in FIG. 6, this data is all-"1" data.

A sequence analogous to the compression sequence is repeated by using the quantization table data in FIG. 6 instead of the quantization table 104, FIG. 3. When the quantization is completed, the DCT coefficients, FIG. 4, are not converted into those shown in FIG. 5 but remain unchanged as in FIG. 4.

When this data is Huffman-coded, image data compression close to loss-less compression can be realized because there is no data loss resulting from quantization.

Furthermore, the input and output transfer sizes of the FIFO memory 112 can be freely set independently of blocks. Therefore, the DCT and inverse DCT unit 102 and the like module operate with a transfer size that empties or almost empties the buffer of each block-fixed module. Additionally, the transfer size can be freely set in the data flow, FIFO memory 112→Huffman encoder 105→FIFO memory 108. This results in an effect of making a pipeline stall hardly occur even if the data read timings via the compressed data interface are more or less shifted or separated.

Figure 7:
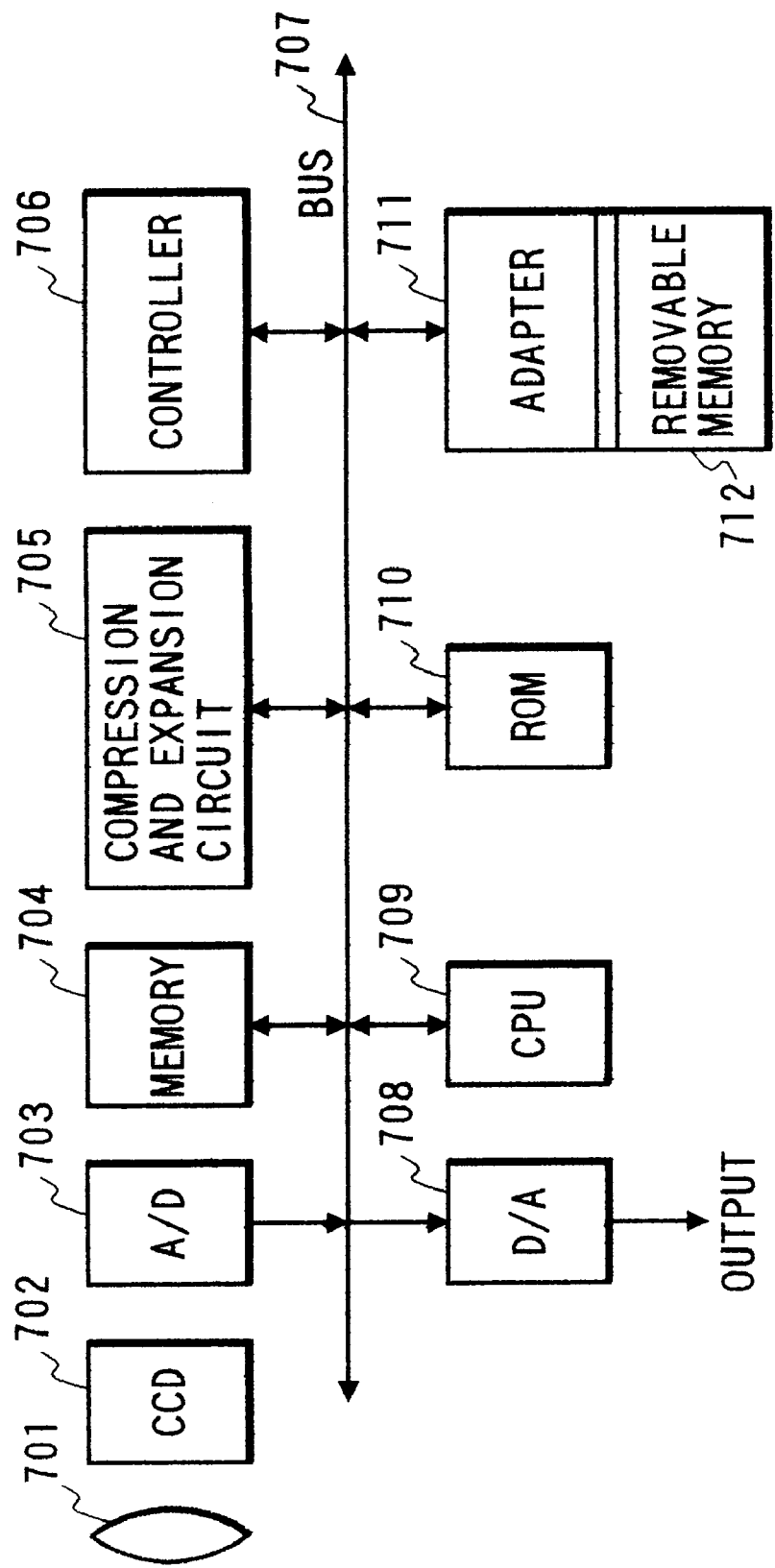
FIG. 7 is a block diagram showing an example of a digital camera using the circuit shown in FIG. 1.

FIG. 7 shows an example of a digital camera using the compression and expansion apparatus in FIG. 1. Referring to FIG. 7, a lens 701 takes an image, and a CCD 702 photoelectrically converts the image. An A/D converter 703 converts the video signal into digital data, and a memory 704 temporarily stores the data. A compression and expansion circuit 705 has the configuration shown in FIG. 1. A D/A converter 708 converts the video data into an analog signal. The camera also includes a CPU 709, a read-only memory (ROM) 710, an adapter 711 for a nonvolatile removable memory 712, a path 707 for communication between these modules, and a controller 706. Note that devices such as an exposure device incorporated into common cameras are not shown in FIG. 7, and a detailed description thereof will be omitted.

The operation of the digital camera with the above arrangement will be described below.

First, programs stored in the ROM 710 operate on the CPU 709, and the digital camera is controlled by the CPU 709 and the controller 706 which is controlled by the CPU 709.

Video data photoelectrically converted by the CCD 702 via the lens 701 is converted into digital data by the A/D converter 703 and transferred to the memory 704 under the control of the CPU 709. In accordance with the programs in the ROM 710, the CPU 709 performs arithmetic operations for the image data in the memory 704, executing video signal processing. The CPU 709 then transfers the image data to the compression and expansion circuit 705 where the data is compressed. The compressed data is transferred to the removable memory 712 via the adapter 711.

In reproduction of the image data, the CPU 709 reads out the image data from the removable memory 712 into the compression and expansion circuit 705. The compression and expansion circuit 705 expands the data, and the CPU 709 transfers the expanded data to the memory 704. The CPU 709 reads out the video data stored in the memory 704 into the D/A converter 708, and the D/A converter 708 outputs an analog video signal.

The second embodiment of the present invention will be described below.

Figure 8:
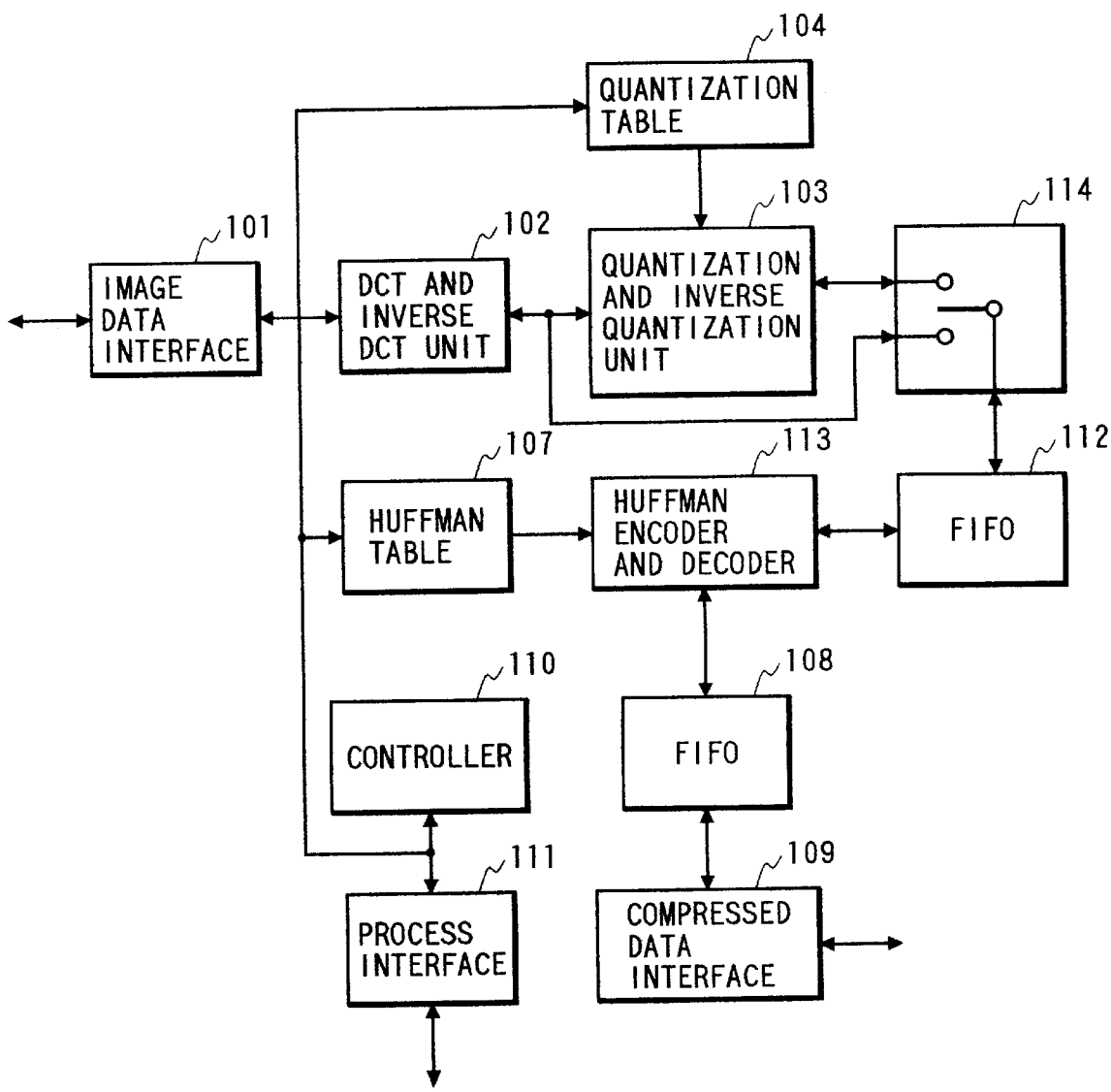
FIG. 8 is a block diagram showing the second embodiment of the present invention.

In FIG. 8, the same reference numerals as in FIG. 1 denote the same parts and a detailed description thereof will be omitted. A Huffman encoder and decoder 113 in FIG. 8 is a block including the Huffman encoder 105 and the Huffman decoder 106 in FIG. 1.

In performing loss-less compression, quantization is performed using an all-"1" quantization table in the first embodiment. Instead, this embodiment uses a switch 114 to apply an output from a DCT and inverse DCT unit 102 directly to a FIFO memory 112 without performing quantization by using a quantization and inverse quantization unit 103.

In the first embodiment, table data can be rewritten without altering the hardware configuration. In this second embodiment, higher-speed processing can be expected because the quantization and inverse . quantization unit 103 is bypassed by the addition of hardware.

In the embodiments of the present invention as described above, the first storage means is provided to store quantized data and apply the data to the compression-coding means. This prevents the second storage means for storing compression-coded data from becoming full and thereby avoids a pipeline stall. This can effectively increase the processing speed.

In the above embodiments, the all-"1" quantization table data is used in quantization. Consequently, pseudo loss-less compression coding can be realized without increasing the circuit scale.

In the above embodiments, a transformation coefficient is directly compression-coded without performing any quantization. Accordingly, pseudo loss-less compression coding can be realized without increasing the circuit scale.

In the above embodiments, quantization is done by using all-"1" quantization table data, and the first storage means is provided to store the quantized data and apply the data to the compression-coding means. Therefore, pseudo loss-less compression can be performed without increasing the circuit scale. Additionally, it is possible to prevent the second storage means from becoming full and thereby eliminate a pipeline stall. This can effectively increase the processing speed.

In the above embodiments, a transformation coefficient is compression-coded without performing quantization, and the first storage means is provided to store the transformation coefficient and apply the coefficient to the compression-coding means. Consequently, pseudo loss-less compression can be realized without increasing the circuit scale. It is also possible to prevent the second storage means from becoming full and thereby eliminate a pipeline stall. This can effectively increase the processing speed.

In the above embodiments, one of a transformation coefficient and quantized data is selected, and the first storage means is provided to store the selected transformation coefficient or quantized data and apply the coefficient or data to the compression-coding means. This allows a single circuit to perform regular compression coding if the quantized data is selected and pseudo loss-less compression coding if the transformation coefficient is selected. It is also possible to prevent the second storage means for storing the compression-coded data from becoming full and thereby eliminate a pipeline stall. This can effectively increase the processing speed.

What is claimed is:

1. An image compression apparatus comprising:

orthogonal transforming means for orthogonally transforming image data to obtain a transformation coefficient;

quantizing means for quantizing the transformation coefficient by using a quantization table to obtain quantized data;

switching means for providing a selected one of an output of said orthogonal transforming means and an output of said quantizing means as an output of said switching means, wherein said switching means performs such a selection every n blocks, where n is a natural number;

first storage means for storing the output of said switching means as stored data;

controlling means for controlling a reading-out operation of said first storage means to read out the stored data;

compression-coding means for compression-coding the data read out from said first storage means to obtain coded data; and second storage means for storing the coded data, wherein said controlling means controls the reading-out operation of said first storage means based on a condition of said second storage means.

2. An image compression apparatus comprising:

orthogonal transforming means for orthogonally transforming image data to obtain a transformation coefficient;

quantizing means for quantizing the transformation coefficient by using all-"1" quantization table data to obtain quantized data;

switching means for providing a selected one of an output of said orthogonal transforming means and an output of said quantizing means as an output of said switching means, wherein said switching means performs such a selection every n blocks, where n is a natural number;

first storage means for storing the output of said switching means as stored data;

controlling means for controlling a reading-out operation of said first storage means to read out the stored data;

compression-coding means for compression-coding the data read out from said first storage means to obtain coded data; and second storage means for storing the coded data, wherein said controlling means controls the reading-out operation of said first storage means based on a condition of said second storage means.

3. An image compression apparatus comprising:

orthogonal transforming means for orthogonally transforming image data to obtain a transformation coefficient;

quantizing means for quantizing the transformation coefficient by using a quantization table to obtain quantized data;

selecting means for selecting between the transformation coefficient and the quantized data, so as to select one of the transformation coefficient and the quantized data;

first storage means for storing the selected one of the transform coefficient and the quantized data;

controlling means for controlling a reading-out operation of said first storage means to read out the selected one of the transform coefficient and the quantized data;

compression-coding means for compression-coding the selected one of the transform coefficient and the quantized data read out from said first storage means to obtain coded data; and second storage means for storing the coded data, wherein said controlling means controls the reading-out operation of said first storage means based on a condition of said second storage means.

* * * * *

UNITED STATES PATENT AND TRADEMARK OFFICE
CERTIFICATE OF CORRECTION

PATENT NO.    : 6,075,897
DATED         : June 13, 2000
INVENTOR(S)   : MASATO KOSUGI It is certified that error appears in the above-identified patent and that said Letters Patent is hereby corrected as shown below:

ON THE TITLE PAGE [56]:

References Cited, U.S. PATENT DOCUMENTS, "5,357,584 10/1994 Yamoska" should read --5,357,584 10/1994 Yamaoka--.

COLUMN 3:

Line 3, "processors" should read --processor--.

COLUMN 4:

Line 14, "Read flag" should read --Ready flag--.

COLUMN 5:

Line 10, "is proceeded" should read --proceeds--.

UNITED STATES PATENT AND TRADEMARK OFFICE
CERTIFICATE OF CORRECTION

PATENT NO. : 6,075,897

DATED : June 13, 2000

INVENTOR(S) : MASATO KOSUGI

It is certified that error appears in the above-identified patent and that said Letters Patent is hereby corrected as shown below:

COLUMN 8:

Line 33, "transform" should read --transformation--;
    Line 36, "transform" should read --transformation--; and
    Line 38, "transform" should read --transformation--.

Signed and Sealed this

Twenty-second Day of May, 2001

Attest:

NICHOLAS P. GODICI

*Attesting Officer*      *Acting Director of the United States Patent and Trademark Office*